United States Patent [19]

Sexton

[11] 3,877,885

[45] Apr. 15, 1975

[54] COPPER-CLAD ALUMINUM WIRE AND METHOD OF MAKING

[75] Inventor: Peter Sexton, Attleboro, Mass.

[73] Assignee: Texas Instruments Incorporated, Dallas, Tex.

[22] Filed: Dec. 2, 1970

[21] Appl. No.: 94,541

[52] U.S. Cl. .................. 29/197; 29/474.1; 204/105
[51] Int. Cl. ........................ B32b 15/02; B21c 37/04
[58] Field of Search ................ 29/196.3, 197, 191.6; 204/105

[56] References Cited

UNITED STATES PATENTS

| | | | |
|---|---|---|---|
| 2,100,258 | 11/1937 | Larson | 29/197 |
| 2,612,682 | 10/1952 | Burrack | 29/197 X |
| 3,256,071 | 6/1966 | Singleton et al. | 29/191.6 |
| 3,463,620 | 8/1969 | Winter | 29/191.6 X |
| 3,474,516 | 10/1969 | Finlay | 29/196.3 X |
| 3,555,169 | 1/1971 | Miller | 29/196.3 X |

*Primary Examiner*—Allen B. Curtis
*Attorney, Agent, or Firm*—Harold Levine; John A. Haug; James P. McAndrews

[57] ABSTRACT

A copper-clad aluminum wire is shown to have a cladding formed of electrolytic tough pitch copper. This copper material is selected in a particular way to assure that the copper material is free of particles of copper oxide exceeding a selected maximum size. Use of this cladding material provides a more economical copper-clad aluminum wire of improved electrical conductivity which is readily drawn by conventional wire drawing techniques without risk of damage to the wire cladding and without risk of wire breakage.

8 Claims, No Drawings

COPPER-CLAD ALUMINUM WIRE AND METHOD OF MAKING

Copper-clad aluminum wire is rapidly becoming a major factor in the electrical wire industry as an economical and light weight substitute for solid copper wire. Processes have been developed for producing such clad or composite wire in an economical manner and new applications of the wire are being introduced with increasing frequency. Usually, the clad wire is formed with a relatively large original diameter as is solid copper wire, either wire than being drawn to reduced diameters as small as 0.005 inches to meet customer requirements for specific applications. In order to be an effective substitute for solid copper wire in a commercial situation where stock wire materials are drawn to smaller sizes to meet customer needs, copper-clad aluminum wire should be drawn as easily as solid copper wire, preferably using the same methods and apparatus as are used in drawing solid copper wire. Commercially available copper-clad aluminum wires have these drawing properties and are now drawn to meet customer requirements substantially interchangeably with solid copper wire.

In this regard, however, it should be noted that solid copper wires used as electrical conductors conventionally embody electrolytic tough pitch (ETP) copper. This copper material is readily available at significantly lower cost than other copper materials and displays high electrical conductivity on the order of 100 percent IACS or more. That is, the conductivity of ETP copper meets or exceeds the standards set for copper wire conductors. On the other hand, commercially available copper-clad aluminum wires have always had claddings formed of other copper materials such as deoxidized low phosphorous (DLP) copper, use of these other copper materials having been required to avoid the occurrence of excessive cladding defects and wire breakage during drawing of the composite wire. These other copper materials tend to display relatively lower electrical conductivity than ETP copper and are available only at significantly greater cost. For example, DLP copper displays about 97 percent IACS electrical conductivity.

It is an object of this invention to provide a novel and improved copper-clad aluminum wire; to provide such a composite wire which achieves improved electrical conductivity at relatively lower cost; to provide such a composite wire which is readily drawn to very small size using the same methods and equipment as are used in drawing solid copper wire; to provide such composite wire which is readily drawn without excessive occurrence of cladding defects or wire breaks; and to provide novel and improved methods for making such composite wires.

In accordance with this invention, copper-clad aluminum wire is formed with a cladding of electrolytic tough pitch (ETP) copper, the electrolytic tough pitch copper being especially selected so that the copper material is substantially free of copper oxide particles larger than a selected size. In this regard, it is known that electrolytic tough pitch copper has a relatively high oxygen content and it is found that this oxygen content is usually present in commercially available ETP copper in the form of relatively large particles of copper oxide. It is also found that these copper oxide particles do not display the drawability usually associated with metals. Further, it is recognized that the copper claddings in composite copper-clad aluminum wires tend to become very thin when the clad or composite wires are drawn to relatively small diameters. In fact, it is found that the thicknesses of the copper claddings in such composite wires are frequently smaller than the copper oxide particles found in commercially available ETP copper, this mismatch of the copper oxide particle size with respect to wire cladding thickness being responsible for the occurrence of many cladding defects and wire breaks when such composite wires are drawn to relatively small size. In accordance with this invention, the ETP copper used in forming copper-clad aluminum wire is selected so that the oxygen content of the copper material is present in the form of relatively small copper oxide particles. Preferably the copper oxide particles are significantly smaller than the smallest cladding thickness likely to be encountered in a composite copper-clad aluminum wire. This copper material is readily bonded to an aluminum core in the conventional process for making copper-clad aluminum wire without significant change in the size of the copper oxide particles in the copper material. The resulting copper-clad wire is then found to be drawable interchangeably with solid copper wire while remaining substantially free of cladding defects and without tending to cause any excessive occurrence of wire breakage. In this way, the composite wire is formed with less expensive copper material but displays at least a small degree of improvement in electrical conductivity over existing copper-clad aluminum wires, these two improvements being achieved while permitting the composite wire to be drawn to very small size without occurrence of cladding defects or wire breaks.

For example, copper-clad aluminum wire is generally formed with a diameter on the order of 0.312 inches in processes such as those illustrated in U.S. Pat. Nos. 3,408,727, 3,444,603 and 3,455,016. Usually these composite wires are formed with a selected cladding thickness such that the copper material in the wire comprises either ten or fifteen percent of the total volume of the composite wire, thereby to provide the wire with selected electrical conductivity and other desired properties. When such composite wires are drawn to reduced diameters on the order of 0.005 inches as is frequently required, the average copper cladding thicknesses in these small wires are on the order of 0.000195 and 0.000128 inches respectively while the minimum cladding thicknesses in these wires can be as small as 0.000160 and 0.000100 inches respectively. On the other hand, electrolytic tough pitch copper is conventionally produced in a process which creates copper oxide particles in the copper material which are relatively much larger than the copper cladding thicknesses of the noted, small composite wires. That is, in forming ETP copper, cathode copper material formed during conventional electrolytic refining of copper is usually melted and cast into copper billets having a cross-sectional thickness of 9 inches or more, the cast billets being then cooled in a chill casting process. In this process, it is found that until the cast billet has cooled sufficiently so that no copper material in the billet remains in the liquid phase, copper oxide particles in the billets tend to continually grow in size, such copper billets having thicknesses of 9 inches or more tending to have a high incidence of copper oxide particles which have a maximum transverse dimension of as much as 0.000480 inches or more. While such large copper oxide particles are not usually perfect spherical in shape, the large size and frequency of incidence of the large particles in the copper material creates a substantial probability that the copper oxide particles will tend to interfere with drawing of a composite copper-clad wire and will tend to create cladding defects and wire breaks during drawing of the composite wire to small diameters, particularly where the wire is drawn to diameters in the range from 0.003 to 0.020 inches.

In accordance with this invention melted cathode copper produced by the conventional electrolytic copper refining process is chill cast in billets having a cross-sectional thickness on the order of 5 inches or less. These billets are cooled in a conventional chill casting process and it is found that the billets are cooled more rapidly than are the larger billets noted above. Further, it is found that the largest copper oxide particles encountered in the billets have a maximum transverse dimension on the order of about 0.000190 inches. Further particles of these largest sizes tend to occur in the billets with relatively low incidence and these largest particles are usually not cubicle in shape so that other transverse dimensions of the particles are relatively smaller than 0.000190 inches. In accordance with this invention, the electrolytic tough pitch copper cast in these relatively small billets is then clad to an aluminum core material in the manner noted in the patents identified above so that no liquid phase is ordinarily induced in the copper material during the cladding process. Thus the sizes of the copper oxide particles in the cladding materials remain relatively small as in the original cast billets. Preferably, the cladding process is regulated in conventional manner so that the cladding formed in the composite wire comprises either 10 or 15 percent of the total volume of the composite wire. When such composite copper-clad aluminum wire is drawn to reduced size from 0.003 to 0.020 inches in diameter by the conventional methods used in drawing solid copper wire, it is found that the wire is readily drawn without the occurrence of any significant number of cladding defects and without any tendency for wire breakage to occur. That is, although the copper cladding material utilized incorporates some copper oxide particles having a maximum transverse dimension of about 0.000190 inches and although the composite wire is drawn to a reduced diameter which may produce a cladding thickness somewhat smaller than this maximum transverse dimension of the largest copper oxide particles in the cladding material, the relatively low incidence of copper oxide particles of these largest sizes and the fact that other transverse dimensions of these largest particles are relatively smaller than the maximum particle dimension permits the wire claddings to accommodate such copper oxide particles without permitting the copper oxide particles to interfere with drawing of the composite wire. Of course, where the electrolytic tough pitch copper utilized in forming copper-clad aluminum wire according to this invention is cast in even thinner billets so that the maximum copper oxide particle size in the billets is substantially smaller than as noted above, there will be an even lower incidence of cladding defects during drawing of the composite wire. Preferably, the electrolytic tough pitch copper used in the composite wire has a maximum copper oxide particle size smaller than the smallest wire cladding thickness likely to be encountered in drawing the composite wire.

It should be understood that chill casting of cathode copper in billet thicknesses of 5 inches or less represents only one of many possible ways for providing electrolytic tough pitch copper having relatively small copper oxide particles therein. For example, the copper oxide particle size is also limited by use of relatively faster rates for cooling cast billets of the copper material. What is important to this invention, is that the copper cladding material comprise electrolytic tough pitch copper having maximum copper oxide particle sizes not greater than about 0.000190 inches and that the cladding material be bonded to an aluminum core to form the desired composite wire in a process which does not induce a liquid phase in the copper material or which does not otherwise cause significant growth of the size of the copper oxide particles in the cladding material.

As will be understood, the aluminum core material utilized in the composite wire of this invention is of any conventional type but preferably comprises a low cost material of relatively high electrical conductivity such as EC Aluminum having a composition, by weight, of 99.45 percent (min.) aluminum, balance impurities; 1100 Aluminum having a composition, by weight, of 1.00 percent (max.) silicon plus iron, 0.20 percent (max.) copper, 0.05 percent (max.) manganese, 0.10 percent (max.) zinc, and balance aluminum with no more than 0.05 percent of any other constituents and with no more than 0.15 percent total of other constituents; 5052 Aluminum having a composition, by weight, of 0.45 percent (max.) silicon plus iron, 0.10 percent (max.) copper 0.10 percent (max.) manganese, 2.2 to 2.8 percent magnesium, 0.15 to 0.35 percent chromium, 0.10 percent (max.) zinc, and the balance aluminum with no more than 0.05 percent of any other constituent and with no more than 0.15 percent total of other constituents; CK 74 Aluminum having a nominal composition, by weight, of 0.7 percent iron, 0.15 percent magnesium 0.015 percent boron, 99.0 percent aluminum and remainder impurities; and CK76 Aluminum having a nominal composition, by weight, of 0.85 percent iron, 0.015 percent boron, 99.0 percent aluminum and remainder impurities.

It should be understood that although particular embodiments of the composite wire and methods of this invention have been described by way of illustration, this invention includes all modifications and equivalents of the described embodiments of the invention which fall within the scope of the appended claims.

What is claimed is:

1. A copper-clad aluminum wire comprising an aluminum core having a copper cladding metallurgically bonded to said core, said cladding being formed of electrolytic tough pitch copper which is substantially free of particles of copper oxide having a maximum transverse dimension greater than about 0.000190 inches.

2. A copper-clad aluminum wire as set forth in claim 1 wherein said wire has a diameter in the range from 0.003 to 0.020 inches and wherein said copper-cladding material comprises up to about 15 percent of the total volume of said wire.

3. A copper-clad aluminum wire as set forth in claim 1 wherein said aluminum core is formed of a material selected from the group consisting of an alloy having a composition, by weight, of 99.45 percent (min.) aluminum and the balance impurities; an alloy having a composition, by weight, of 1.00 percent (max.) silicon plus iron, 0.20 percent (max.) copper, 0.05 percent (max.) manganese, 0.10 percent (max.) zinc, and the balance aluminum with no more than 0.05 percent of any other constituents and with no more than 0.15 percent total of other constituents; an alloy having a composition, by weight, of 0.45 percent (max.) silicon plus iron, 0.10 percent (max.) copper, 0.10 percent (max.) manganese, 2.2 to 2.8 percent magnesium, 0.15 to 0.35 percent chromium, 0.10 percent (max.) zinc, and the balance aluminum with no more than 0.05 percent of any other constituent and with no more than 0.15 percent total of other constituents; an alloy having a composition, by weight, of 0.7 percent iron, 0.15 percent magnesium 0.015 percent boron, 99.0 percent aluminum and the remainder impurities; and an alloy having a composition, by weight, of 0.85 percent iron, 0.015 percent boron, 99.0 percent aluminum and the remainder impurities.

4. A method for making inexpensive composite, copper-clad aluminum wire of improved electrical conductivity which is adapted to be drawn to relatively small composite wire diameters on the order of 0.005 inches, said method comprising the steps of providing at least one strip of electrolytic tough pitch copper which is substantially free of particles of copper oxide therein having a maximum transverse dimension greater than about 0.000190 inches, providing an aluminum core wire, and metallurgically bonding said copper material to said aluminum core wire to form a composite copper-clad aluminum wire.

5. A method as set forth in claim 4 wherein said copper material is metallurgically bonded to said aluminum core material in the solid phase of said copper material.

6. A method as set forth in claim 4 wherein said copper strip and aluminum core materials are of selected size such that said copper material in said composite wire comprises up to about 15 percent of the total volume of said composite wire.

7. A method as set forth in claim 4 wherein said aluminum core wire is formed of a material selected from the group consisting of an alloy having a composition, by weight, of 99.45 percent (min.) aluminum and the balance impurities; an alloy having a composition, by weight, of 1.00 percent (max.) silicon plus iron, 0.20 percent (max.) copper, 0.05 percent (max.) manganese, 0.10 percent (max.) zinc, and the balance aluminum with no more than 0.05 percent of any other constituents and with no more than 0.15 percent total of other constituents; an alloy having a composition, by weight, of 0.45 percent (max.) silicon plus iron, 0.10 percent (max.) copper, 0.10 percent (max.) manganese, 2.2 to 2.8 percent magnesium, 0.15 to 0.35 percent chromium, 0.10 percent (max.) zinc, and the balance aluminum with no more than 0.05 percent of any other constituent and with no more than 0.15 percent total of other constituents; an alloy having a composition, by weight, of 0.7 percent iron, 0.15 percent magnesium 0.015 percent boron, 99.0 percent aluminum and the remainder impurities; and an alloy having a composition, by weight, of 0.85 percent iron, 0.015 percent boron, 99.0 percent aluminum and the remainder impurities.

8. A method for making inexpensive composite, copper-clad aluminum wire of improved electrical conductivity which is adapted to be drawn to relatively small composite wire diameters on the order of 0.005 inches, said method comprising the steps of casting cathode copper in relatively thin billets having a thickness up to about 5 inches and rapidly cooling said cast copper material to form a billet of electrolytic tough pitch copper which is substantially free of particles of copper oxide having a maximum transverse dimension greater than about 0.000190 inches, forming at least one strip of said copper material from said billet, providing an aluminum core wire, and solid phase metallurgically bonding said copper strip material to said aluminum core wire to form a composite copper-clad aluminum wire.

* * * * *